United States Patent [19]

De Bella

[11] 4,106,582

[45] Aug. 15, 1978

[54] ENGINE-GENERATOR MOUNTING FOR A VEHICLE

[76] Inventor: Gasper V. De Bella, c/o Lothrop & West 1150 Alcoa Bldg., San Francisco, Calif. 94111

[21] Appl. No.: 741,293

[22] Filed: Nov. 12, 1976

[51] Int. Cl.² .............................................. D60K 13/04
[52] U.S. Cl. ................................. 180/64 A; 180/64 L
[58] Field of Search .................. 180/68.5, 65 C, 65 B, 180/64 A, 64 L, 54 A

[56] References Cited

U.S. PATENT DOCUMENTS

| 2,353,266 | 7/1944 | Reid | 180/54 A X |
| 3,497,027 | 2/1970 | Wild | 180/68.5 |

FOREIGN PATENT DOCUMENTS

| 1,107,539 | 5/1961 | Fed. Rep. of Germany | 180/54 A |
| 1,129,709 | 10/1968 | United Kingdom | 180/65 R |

Primary Examiner—Joseph F. Peters, Jr.
Assistant Examiner—Milton L. Smith
Attorney, Agent, or Firm—Lothrop & West

[57] ABSTRACT

An engine-generator mounting for use in a vehicle having a floor and a frame side rail includes a pair of parallel, telescoping slides supported on the floor. The engine-generator is mounted on the slides for movement between a first position and a second position. An exhaust pipe on the engine-generator extends from the engine vertically downwardly to a muffler disposed below the floor and the frame side rail. To accommodate the exhaust pipe when the engine is moved between the first and second positions a slot is provided in the floor around the vertical exhaust pipe. An air blower on the engine-generator discharges downwardly through a portion of the slot normally unoccupied by the exhaust pipe and substantially onto the muffler.

3 Claims, 2 Drawing Figures

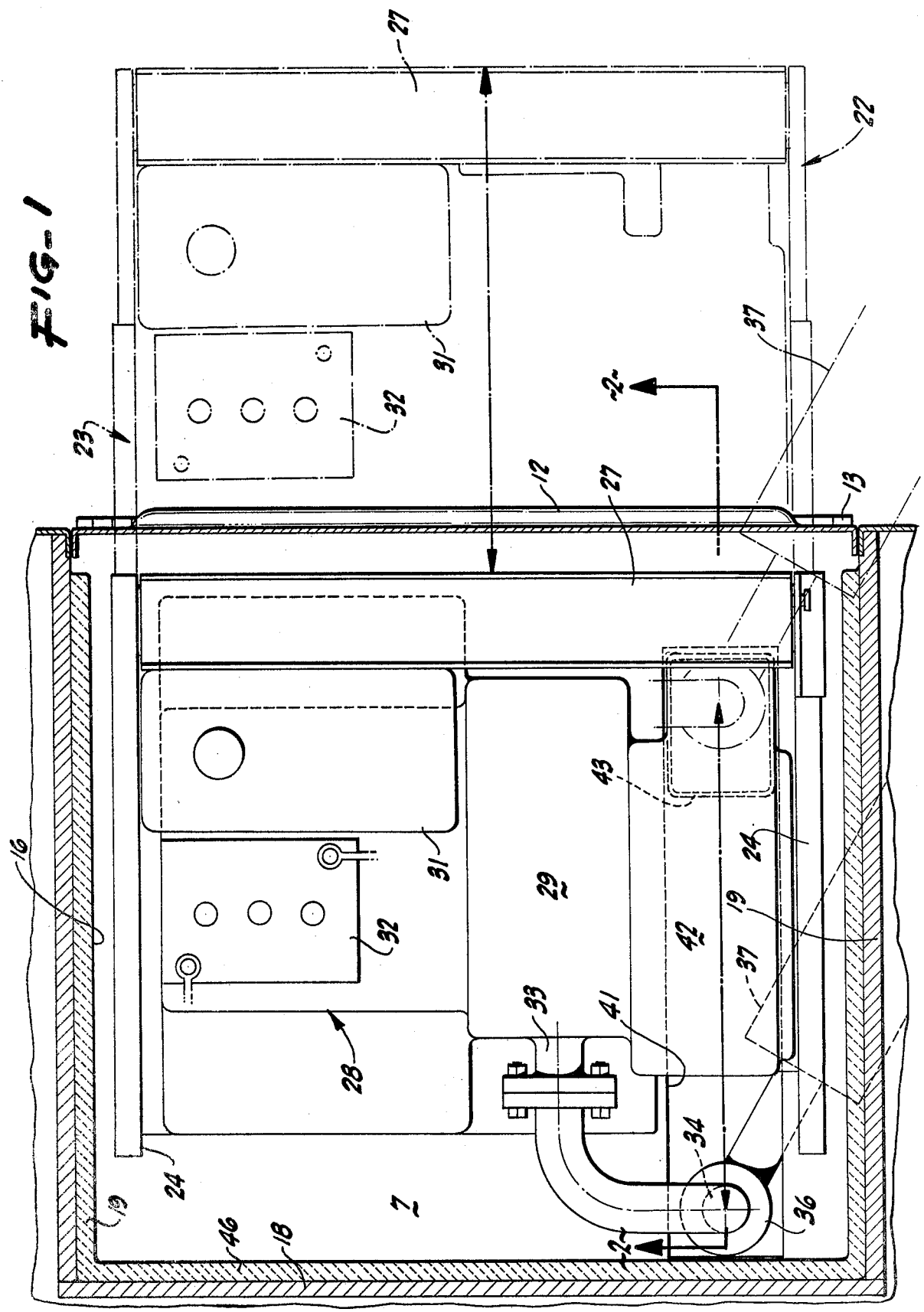

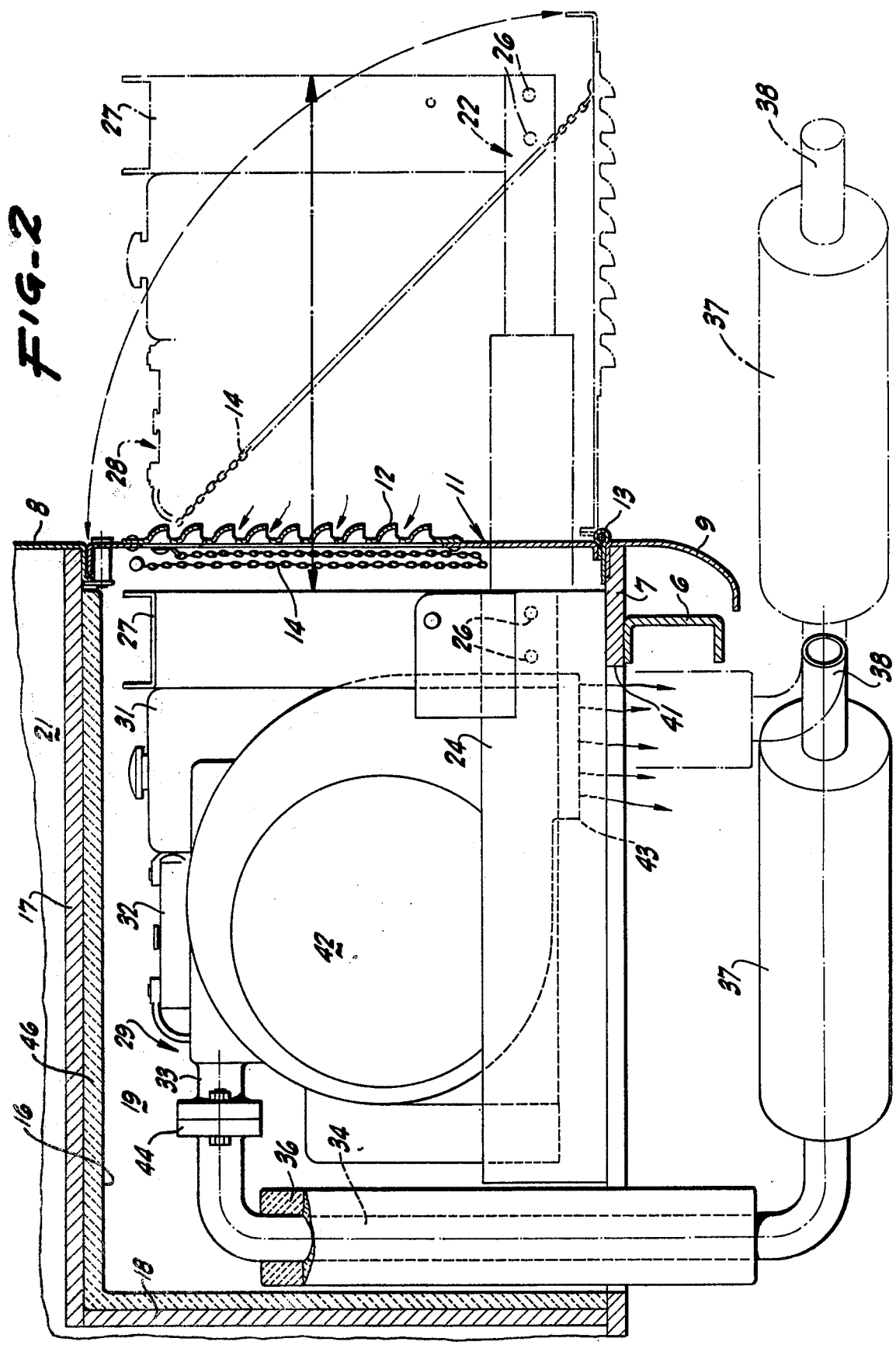

4,106,582

ENGINE-GENERATOR MOUNTING FOR A VEHICLE

BRIEF SUMMARY OF THE INVENTION

For use in a vehicle, especially a recreational vehicle, there is provided an auxiliary engine-generator set mounted on telescoping slides supported on the vehicle floor. The engine is movable between a first position within the vehicle body to a second position extending at least partially from the vehicle body. The exhaust pipe from the engine has a vertical position extending downwardly to a location beneath the floor and connects to a muffler disposed lower than the frame side rail. To accommodate the vertical portion of the exhaust pipe there is provided an elongated slot in the floor. An air blower on the engine-generator is arranged just above the slot to discharge normally through a portion unoccupied by the exhaust pipe and downwardly substantially onto the muffler, the arrangement being such that the engine-generator unit plus the exhaust pipe and muffler can readily be moved between the state positions.

BRIEF DESCRIPTION OF THE SEVERAL VIEWS OF THE DRAWING

FIG. 1 is a plan of a portion of a recreational vehicle showing the engine-generator mounting of the invention installed therein, certain portions being broken away and other portions being illustrated diagrammatically.

FIG. 2 is a cross-section on a vertical-transverse plane, the plane of section being indicated generally by the line 2—2 of FIG. 1.

DETAILED DESCRIPTION

In many vehicles, particularly recreational vehicles having their own motive power, there is also provided an auxiliary motor-generator set utilized to supply various needs of the recreational vehicle and operable independently of the operation of the main vehicle engine. Such an auxiliary motor-generator set is often awkward to stow in the recreational vehicle without interfering substantially with other important space-occupying units, and so that it is not obtrusive during its operation as to noise, odor, temperature conditions, gas and air discharge or the like and so that it is readily accessible not only for initial installation but also for subsequent inspection, servicing and possible replacement.

It is therefore an object of the invention to provide a motor-generator mounting which can readily be arranged in a generally standard recreational vehicle in a fashion which is out of the way of other installations and is unobtrusive so far as the interior vehicle volume is concerned.

Another object of the invention is to provide an engine-generator mounting that positions and arranges the motor-generator so that it is in effect outside the living quarters of the recreational vehicle, although compactly stowed and generally within the body envelope.

A further object of the invention is to provide a motor-generator set that is easily installed in the usual motor vehicle and can easily be inspected and serviced or interchanged.

A further object of the invention is to provide a motor-generator mounting which is safe and strong, although economical to manufacture and maintain.

While the motor-generator mounting of the invention can be easily installed in various different vehicles, it is especially adapted for use in a partially illustrated recreational vehicle having the usual chassis. This includes a longitudinal frame side rail 6 on which a floor 7 is disposed in a generally horizontal plane extending both crosswise and longitudinally of the vehicle. There is normally provided a vehicle side wall 8 and a depending side apron 9 between which a door 11 having ventilating louvers 12 therein and mounted on a lower hinge 13 is disposed. A chain 14 supports the door when it is hinged downwardly as a sort of shelf, and the door is normally provided with a proper fastening to hold it in its upright closed position. The door partially defines a compartment 16 separated from its surroundings not only by the floor 7 but also by a top wall 17, a side wall 18 and appropriate end walls such as 19. There is in this fashion provided an accessible compartment 16 which, however, is completely isolated from the interior quarters 21 of the remainder of the vehicle.

Pursuant to the invention, the vehicle floor 7 is provided with a pair of telescoping slides 22 and 23 disposed so that they can easily be retained within the confines of the compartment 16 when the door is closed or can be extended, perhaps in two stages, to project outboard a substantial distance when the door is open. The slides 22 and 23 are on one side supported on the floor 7 through suitable brackets 24 and on the other side are secured by suitable fastenings 26 to an upstanding framework 27 forming part of an engine-generator mount.

Secured to the frame 27 and its appurtenances is any standard form of engine-generator set 28. Illustrated somewhat diagrammatically herein, the engine-generator set includes not only the customary internal combustion engine 29, preferably of an air cooled sort, but likewise may carry a fuel tank 31 and a battery 32 on the same framework so as to be considered a unit with the engine.

The arrangement is such that the engine-generator mounted on the slides can move above the floor 7 between a first position as illustrated in FIG. 1 in the full lines and a second outboard or extended position as illustrated generally by dotted lines in FIG. 1.

Incorporated with the mechanism of the engine is an exhaust pipe 33 having a vertical portion 34 which extends from a point above the floor 7 to a point substantially therebelow. The exhaust pipe conveniently carries lagging or insulation 36 for at least a portion of its length and at its lower end is connected to a generally horizontally extending exhaust muffler 37 having a tailpipe 38 thereon, the position of the muffler being low enough so that the muffler is below the lower margin of the panel 9.

In order that the exhaust pipe 33 can be appropriately accommodated as the engine moves between its first and second positions, there is provided in the floor 7 an elongated slot 41. This extends for a substantial transverse distance since at its inner location it extends around the exhaust pipe when the engine-generator is in the first position and also extends around the exhaust pipe in a second location when the engine-generator is in its second position, the slot being continuous between the two end locations and being of sufficient width easily to accommodate not only the pipe 33 but also the enlarged lagging 36. Some air space is left between the pipe lagging and the floor edge in order to minimize heat transfer.

The engine of the engine-generator set incorporates an air blower 42 which inducts air through the louvers 12, when the door is closed, and through the generally open framework 27 and around the engine cylinders and appurtenances into the central portion of the blower. The blower then discharges such air through an outlet duct 43, usually of rectangular cross-section and scroll shape. The duct 43 is disposed to discharge downwardly through a portion of the slot 41 near the outer location, for this is available when the exhaust pipe is in its first position as shown in FIG. 2. The air outlet 43 stops just short of the floor 7, so that there is a slight space therebetween and so that the exhaust duct can move easily over the floor. While there may be some slight leakage between the floor and the exhaust duct at portions away from the slot, such leakage is entirely immaterial since it is small in extent and tends to be from the compartment through the space and out through the slot 41. Air discharging downwardly from the outlet 43 and through the subjacent portion of the slot 41 continues downwardly substantially over at least a portion of the muffler 37, thus tending to reduce the temperature of the muffler itself by dissipating some of the exhaust heat to the surrounding atmosphere. There is some effect also of dissipating or blowing away and spreading the discharge from the tailpipe 38.

In the use of this device, for initial installation the door is either opened or is not yet mounted and the slides are fastened firmly to the floor 7. The engine-generator set with its frame 27 is then fastened securely to the extended slides. Then the exhaust pipe and muffler are attached, the exhaust pipe being threaded through the slot 41 and fastened by a flange and clamp arrangement 44. Thereupon the battery 32 and the fuel tank 31 can be serviced and the unit can be pushed inwardly into the compartment 16 substantially as shown in FIG. 2. The door is then closed or installed with suitable pins in the hinges 13. At any time the unit can be withdrawn outwardly and/or pushed inwardly for inspection, service or for replacement. The thermal conditions are favorable, and air circulation tends to keep all of the engine fumes and emanations away from the compartment 21 and tends to confine the sound since the interior of the compartment 16 is usually lined with sound absorbent material 46.

I claim:

1. An engine-generator mounting for a vehicle having a frame side rail and a floor above and overlying said frame side rail comprising means on said floor for supporting an engine-generator for movement in a predetermined linear path between a first position above said floor and a second position at least partially extending beyond said floor, an engine-generator on said supporting means and including a rigid exhaust pipe extending from a point above said floor to a location below said floor, means defining an elongated slot in said floor surrounding said exhaust pipe and extending in a direction parallel to said linear path between an inner location around said exhaust pipe when said engine-generator is in said first position and an outer location stopping short of said frame side rail and around said exhaust pipe when said engine-generator is in said second position, and a muffler supported by and connected to said exhaust pipe and disposed lower than said floor and said frame side rail.

2. A device as in claim 1 in which said muffler is disposed substantially beneath said slot when said motor-generator is in said first position.

3. A device as in claim 1 including an air blower on said engine-generator and having an outlet positioned to discharge air through said slot and over at least a portion of said muffler.

* * * * *